United States Patent [19]

List et al.

[11] E Re. 29,132

[45] Reissued Feb. 1, 1977

[54] AUTOMATIC DRY COKE WEIGHT SYSTEM

[75] Inventors: Harold A. List; Jack H. Baker, both of Bethlehem, Pa.

[73] Assignee: Bethlehem Steel Corporation, Bethlehem, Pa.

[22] Filed: Jan. 27, 1976

[21] Appl. No.: 652,671

Related U.S. Patent Documents

Reissue of:

[64] Patent No.: 3,814,914
Issued: June 4, 1974
Appl. No.: 367,264
Filed: June 5, 1973

[52] U.S. Cl. ..... 235/151.1; 177/50; 177/59; 177/120; 177/164; 214/18 R; 235/151.33; 266/80

[51] Int. Cl.² ..... G06G 7/66; G01G 13/02; G01G 13/28

[58] Field of Search ..... 177/50, 59, 120, 164; 202/262; 214/18 R; 235/151, 151.1, 151.13, 151.33; 266/80, 96; 340/419

[56] References Cited

UNITED STATES PATENTS

| | | | |
|---|---|---|---|
| 3,477,529 | 11/1969 | Burn et al. | 177/50 |
| 3,502,162 | 3/1970 | Munson | 177/50 |

*Primary Examiner*—R. Stephen Dildine, Jr.
*Attorney, Agent, or Firm*—Joseph J. O'Keefe; John I. Iverson; Robert M. Jones

[57] ABSTRACT

An analog electrical system utilizes a signal from a coke weighing system and a signal from a coke moisture gauge to correct for prior errors in hopper weighings due to delivery overshoot as well as moisture variations in prior batches of coke.

3 Claims, 2 Drawing Figures

AUTOMATIC DRY COKE WEIGHT SYSTEM

Matter enclosed in heavy brackets [ ] appears in the original patent but forms no part of this reissue specification; matter printed in italics indicates the additions made by reissue.

BACKGROUND OF THE INVENTION

This invention relates to material handling systems, and more particularly to systems for periodically supplying batches of coke to a blast furnace.

In the operation of a blast furnace, a plurality of substances, viz. iron ore, fluxes and a source of carbon such as coke, is periodically supplied to the top of the furnace. The carbon in the coke reduces the iron ore and also provides the heat necessary for the chemical reactions in the furnace to take place. The main product of the furnace is iron; useful byproducts are slag and hot gases for heating in other processes.

In order to insure that the iron ore is substantially completely reduced, it is necessary to provide an excess of carbon to the furnace. However, too much of an excess results in wasted coke as well as iron having an improper chemistry; in addition, hot gases too rich in carbon are produced, and the composition of the slag is improper. For these reasons, it is desirable to closely control the amount of carbon in each batch of coke supplied to the furnace. Typically, a batch may consist of three weighings.

The coke which is supplied to the furnace, being naturally porous, contains moisture in varying amounts. Thus, weighing systems designed to provide constant weight batches of coke must be provided with means to compensate for the moisture in the coke. In addition, means must be provided to compensate for the inevitable errors in weight which occur from weighing to weighing due to overshoot, i.e., the additional amount of coke supplied to the weigh hopper after the coke shut-off signal has occurred.

In the past, attempts have been made to correct for moisture by measuring the moisture content of a sample of coke from a supply being fed to a delivery car, feeding this value to a computer, determining the corrected coke weight, and using this value for controlling the termination of supply to the car. However, no accurate means has been available for determining the moisture content of coke in a short enough period of time for this type of system to be satisfactory.

Attempts have been made to compensate for variations in overshoot by accumulating errors over a long period of time until a predetermined value is reached, at which time a compensatory amount of coke is supplied to the furnace. However, this type of system does not solve the problem of supplying a substantially correct amount of coke at each batch delivery, and this results in iron and byproducts of varying chemistry, and requires more total coke to be sure that the amount of coke does not go below the minimum required to keep the furnace operating.

It is an object of this invention to provide a system for supplying for each weighing of material a control signal which rapidly corrects for all moisture-based and weighing-based errors in prior weighings of material.

SUMMARY OF THE INVENTION

We have discovered that the foregoing object can be obtained by providing means for producing a first signal indicative of the actual weight, i.e. the dry weight plus the moisture content, of a discrete quantity of material. Means is also provided for producing a second signal indicative of the moisture content of this weighing, and further means is provided for producing a third signal indicative of the target dry weight for this quantity of material. Means is provided adapted to receive said first, second and third signals and compute and store a fourth signal indicative of the target dry weight plus (a) the difference between the target dry weight and the actual dry weight of the instant weighing, and (b) the error in dry weight existing after the next preceding weighing. Further means is provided to receive the second signal and the fourth signal and compute and store a fifth signal indicative of the actual desired weight for the next weighing. This assumes that the moisture content of the next weighing will be the same as the moisture content of the instant weighing. Timing means is provided for controlling when these fourth and fifth signals are computed and stored. Means is provided for shutting off the supply of material for the next weighing when the first signal equals the fifth signal.

DESCRIPTION OF THE PREFERRED EMBODIMENT

Figure 1:
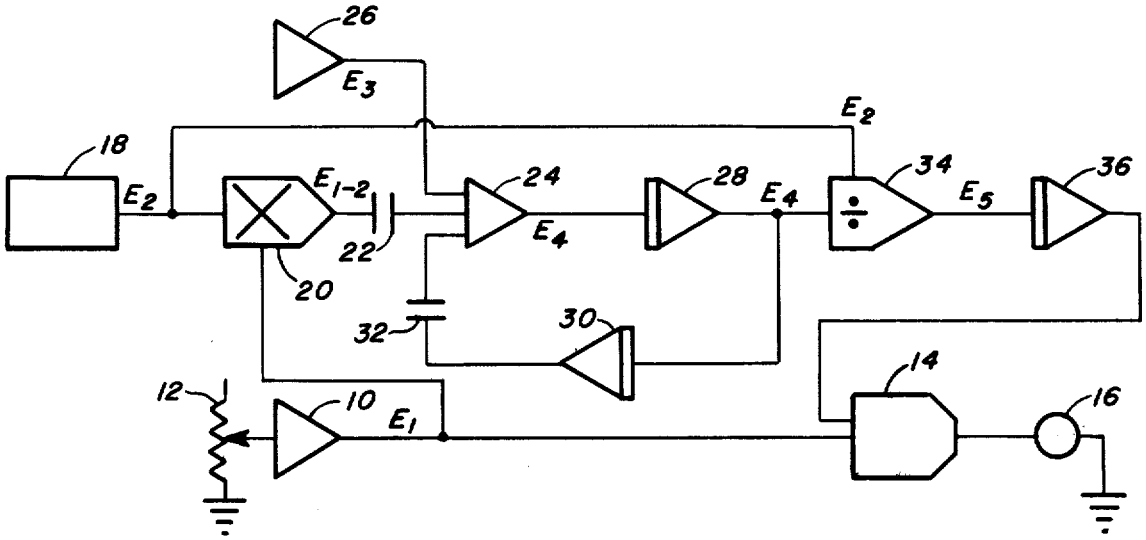
FIG. 1 is a block diagram of the circuit of the invention.

As shown in FIG. 1, the subject circuit comprises a voltage follower 10, connected to a potentiometer 12 attached to the balance which indicates the actual weight of the material in a hopper (not shown) which is to empty into a delivery car periodically supplying coke to a blast furnace. The output of the voltage follower 10 is a first signal $E_1$ indicative of the total actual weight of the coke, i.e., the dry coke plus moisture, in the hopper.

The output of the voltage follower 10 is supplied to a comparator 14 which operates a control relay 16 to stop a conveyor belt supplying coke to the hopper. The comparator 14 actuates the relay 16 when the signal from the voltage follower 10 equals the set point of the comparator, the determination of which will be hereinafter explained.

After the supply of coke to the hopper has terminated, the moisture content of said coke is determined by moisture-measuring means 18, e.g. a nuclear gauge. This gauge comprises a source of gamma radiation which measures the mass or bulk density of the coke, this value varying with the size of the coke particles. That is, a charge of coarse coke will not be as dense as a charge of fine coke. The gauge also provides a source of fast neutron radiation which measures the hydrogen density of the coke. From these measurements, the gauge automatically computes the percentage moisture in the coke. Other types of moisture measurement gauges which give a fast response could also be used. Means 18 produces a signal, herein referred to as the second signal $E_2$, indicative of the percentage moisture of the coke in the hopper. After the moisture content is determined, the hopper is emptied into the delivery car and the coke supplied to the blast furnace.

The outputs from the voltage follower 10 and means 18 are supplied to a multiplier-subtractor 20 which produces an output signal $E_{1-2}$ indicative of the dry weight of the coke just dumped from the hopper.

The output from the multiplier-subtractor 20 is fed through a switch 22, normally closed at all times except during initial start-up, to an adder-subtractor 24. Also supplied to the adder-subtractor 24 is a signal, herein referred to *as* the third signal $E_3$ from a reference module 26. This signal is indicative of the target dry coke weight required for proper blast furnace operation. The adder-subtractor 24 subtracts the actual dry weight of the instant weighing, indicated by the output from the multiplier-subtractor 20, from the target dry coke weight to obtain the error in weight on the instant weighing.

The output from the adder-subtractor 24 is fed to a sample-and-hold module 28, the output of which is fed through a second sample-and-hold module 30 through a switch 32, also normally closed at all times except during initial start-up, back to the adder-subtractor 24. As will be explained later, the output from the sample-and-hold module 30 represents the target dry coke weight plus the error in dry coke weight existing after the previous weighing. Thus, the output of the adder-subtractor 24 is seen to represent the sum of: (1) the net error existing after all previous weighings; (2) the error in the instant weighing; and (3) the target dry coke weight. This signal is herein referred to as the fourth signal $E_4$, and represents the total dry coke desired in the next weighing to eliminate all previous errors.

The fourth signal is fed to a divider-subtractor 34 where it and the percentage moisture signal from means 18 are combined to produce a signal, herein referred to as the fifth signal $E_5$, representative of the actual weight of the next weighing of coke necessary to eliminate any previous errors, assuming that the moisture of the coke in the next hopper to be weighed is the same as that of the coke just emptied into the delivery car. This fifth signal is supplied to a sample-and-hold module 36 where it functions as the set point signal for the comparator 14.

Figure 2:
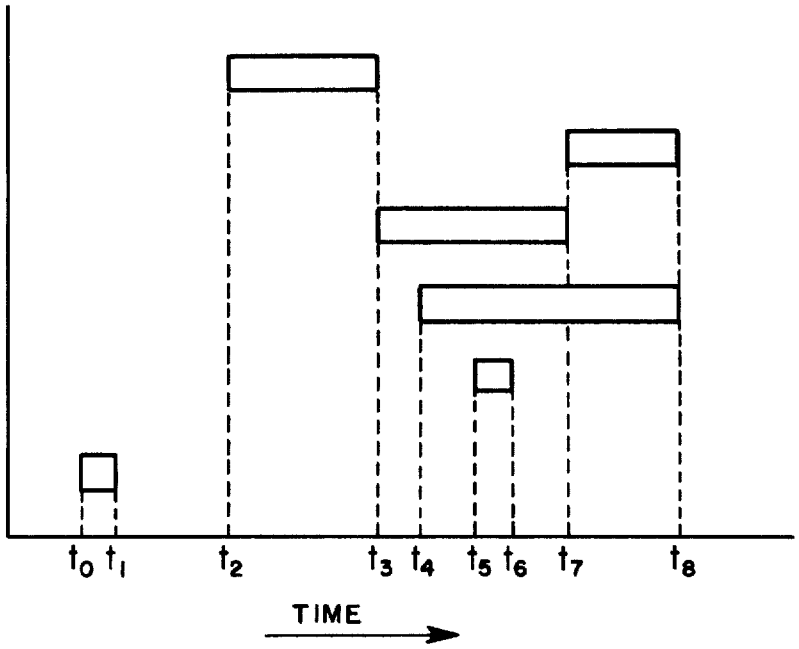
FIG. 2 is a schematic diagram showing the sequence of events during start-up and the initial weighing cycle.

The operation of the subject invention will now be described utilizing FIG. 2 and TABLE I in conjunction with a specific example in which the target dry coke weight is 4,000 pounds.

Initially, i.e. at time $t_0$, a moisture content must be assumed since there is no coke in the hopper. Thus, switch 22 is opened and, since there is no previous error, switch 32 is also opened. For the sample shown in TABLE I, an initial moisture content of 0% is assumed.

Initially, all of the sample-and-hold modules 28, 30 and [34] *36* are in the sample mode. The signal from the reference module 26, viz. 4000 #, is thus fed through adder-subtractor 24 and sample-and-hold 28 to divider-subtractor 34, where, since the input from moisture-measuring means 18 is zero, the output to sample-and-hold 36, and hence the setpoint fed to comparator 14, is also 4000 #. Switches 22 and 32 are then closed at time $t_1$.

Again referring to FIG. 2, at time $t_2$ the hopper begins filling and at time $t_3$ the filling of the hopper is terminated when the signal from the voltage follower 10 equals the setpoint from the sample-and-hold module 36. However, due to a natural overshoot of the coke handling system which, for the purpose of the example is assumed to be 300 # /weighing, a total actual weight of 4300 # of coke is in the hopper. This weight signal is supplied to the multiplier-subtractor 20 from time $t_3$ to time $t_7$, after which time interval the hopper is automatically emptied into the delivery car and supplied to the blast furnace.

Between times $t_2$ and $t_3$, the moisture-measuring means 18 begins to measure the moisture in the coke in the hopper. This measurement is complete by time $t_4$, and a signal representing moisture is fed to the multiplier-subtractor 20 and the divider-subtractor 34 during the interval $t_4$–$t_8$. In the present example, it is assumed that the moisture content of the first weighing was measured as 5%.

At time $t_5$ the system is automatically switched into the compute mode. Sample-and-hold modules [24] *28* and 36 switch into the sample mode, while sample-and-hold module 30 switches into the hold mode, holding the signal previously in module 28, viz. the target dry weight of 4000 #.

The output from the multiplier-subtractor 20 represents the dry coke weight in the hopper, viz. 95% of 4300 #, i.e. 4085 #. The adder-subtractor 24 thus receives the following three inputs: (a) 4000 # from the sample-and-hold module 30; (b) 4000 # from the reference module 26; and (c) 4085 # from the multiplier-subtractor 20. The adder-subtractor 24 adds (a) to [(b)–(c)] to get a desired dry coke value of 3915 #. It is noted that (a) represents the target dry coke weight plus any errors accumulated during all previous weighings, while [(b)–(c)] represents the dry coke weight error of the instant weighing.

The desired dry coke value for the second weighing, i.e. 3915 #, is fed through sample-and-hold module 28 which is in the sample mode, to the divider-subtractor 34 where it is combined to obtain the desired gross weight of the next weighing, i.e. the set-point. This, of course, assumes that the moisture content of the next weighing is the same as that of the instant weighing. The output of the divider-subtractor 34, which is 4121 #, is fed through the sample-and-hold module 36, which is in the sample mode, to the comparator 14.

The calculation period automatically ends at $t_6$, and saple-and-hold module 36 switches into the hold mode, holding the proper setpoint value for the next weighing. At the same time, sample-and-hold module 28 switches into the hold mode, holding its value for the next calculations, while sample-and-hold module 30 switches into the sample mode so it can receive the signal from sample-and-hold module 28 during the next calculation.

At time $t_7$, the weight signal from the voltage follower 10 is terminated and the hopper begins emptying. The hopper is substantially completely empty by time $t_8$, the moisture signal from means 18 is terminated, and the hopper begins to automatically refill. The cycle then repeats itself.

The timing of the filling and emptying of the hopper is controlled by the charging control system of the blast furnace, this system being conventional. The moisture-measuring means 18 automatically provides a signal when the level of the coke exceeds the point in the hopper at which the measurement is taken. A reliable signal, however, is not available until a short time after the hopper is filled, e.g. at $t_4$, because of the time delay of the moisture-measuring means.

A standard cam-timer automatically starts when the hopper begins to fill, and initiates and terminates the compute cycle at $t_5$ and $t_6$, respectively.

The setpoint for the second weighing, as above noted, is 4121 #, and due to the assumed overshoot of 300 #, the hopper fills to 4421 #. Assuming that the moisture content of this second weighing remains at 5%, the calculation for the setpoint for the third weighing is as follows. The output from the multiplier-subtractor 20 is 95% of 4421 #, or 4200 #, which is the dry coke weight in the hopper. The input to the adder-subtractor 24 is 3915 #, the value previously stored in module 28, plus 4000 # (from reference module 26), minus the dry coke weight in hopper, viz, 4200 #. The output of the adder-subtractor 24 is 3715 #, which is fed to the divider-subtractor 34 where it is divided by 95% to determine the setpoint for the third weighing, viz. 3911 #.

Table I shows the values at various points in the subject circuit carried through the first 15 weighings. The values are expressed in percentage moisture and pounds rather than voltages. For illustrative purposes, the moisture is shown as varying in much larger increments than would normally occur; generally, the moisture varies by no more than 2 or 3% from weighing to weighing. Column 9 shows the error for batches of coke consisting of three weighings. This figure is important, since the blast furnace operates essentially as a batch process, and in the case of the blast furnace to which the subject invention was applied, each batch included three weighings of coke. As can be seen, the actual amount of dry coke delivered per batch varied from the desired amount, viz, 12,000 pounds, by a maximum of only 148 pounds for the examples shown. It is noted that this error is nearly balanced by the error in the next batch.

TABLE I

| Weigh Cycle | Gross wt. (wet) $E_1$ | Percent $H_2O$ $E_2$ | Dry wt. $E_{1-2}$ | Target $E_3$ | Instant error $E_{1-2}-E_3$ | Target plus error $E_4$ | Shut off point $E_5$ | Batch error |
|---|---|---|---|---|---|---|---|---|
| Preset | | | | 4,000 | | 4,000 | 4,000 | |
| 1 | 4,300 | 5 | 4,085 | 4,000 | +85 | 3,915 | 4,121 | |
| 2 | 4,421 | 5 | 4,200 | 4,000 | +200 | 3,715 | 3,911 | +95 |
| 3 | 4,211 | 5 | 4,000 | 4,000 | 0 | 3,715 | 3,911 | |
| 4 | 4,211 | 5 | 4,000 | 4,000 | 0 | 3,715 | 3,911 | |
| 5 | 4,211 | 10 | 3,789 | 4,000 | −211 | 3,926 | 4,362 | −5 |
| 6 | 4,662 | 10 | 4,196 | 4,000 | +196 | 3,730 | 4,144 | |
| 7 | 4,444 | 10 | 4,000 | 4,000 | 0 | 3,730 | 4,144 | |
| 8 | 4,444 | 10 | 4,000 | 4,000 | 0 | 3,730 | 4,144 | −148 |
| 9 | 4,444 | 20 | 3,556 | 4,000 | −444 | 4,174 | 5,218 | |
| 10 | 5,518 | 20 | 4,414 | 4,000 | +414 | 3,760 | 4,700 | |
| 11 | 5,000 | 20 | 4,000 | 4,000 | 0 | 3,760 | 4,700 | +138 |
| 12 | 5,000 | 20 | 4,000 | 4,000 | 0 | 3,760 | 4,700 | |
| 13 | 5,000 | 10 | 4,500 | 4,000 | +500 | 3,260 | 3,622 | |
| 14 | 3,922 | 10 | 3,530 | 4,000 | −470 | 3,730 | 4,144 | +10 |
| 15 | 4,444 | 10 | 4,000 | 4,000 | 0 | 3,730 | 4,144 | |

We claim:

1. Apparatus for automatically measuring and controlling the net dry weight of discrete quantities of moisture-containing material, comprising:

(a) means for producing a first signal indicative of the actual weight of each discrete quantity of material;

(b) means for producing a second signal indicative of the moisture content of said material;

(c) means for producing a third signal indicative of the target dry weight for each weighing of said material;

(d) means adapted to receive said first, second and third signals and compute and store a fourth signal indicative of the target dry weight, plus the difference between said target dry weight and the actual dry weight of the instant weighing, plus the error in dry weight existing after the next preceding weighing;

(e) means adapted to receive said second signal and said fourth signal and compute and store a fifth signal indicative of the actual desired weight for the next weighing;

(f) timing means for controlling when said fourth and fifth signals are computed and stored; and (g) means for shutting off the supply of said material to said next weighing when said first signal equals said fifth signal.

2. Apparatus as recited in claim 1, in which means (d) comprises:

i. means for converting said first signal into an adjusted signal indicative of the actual dry weight of the instant weighing;

ii. [ means for summing said third signal, said adjusted signal, and a signal indicative of the error in dry weight existing after the next preceeding weighing; ] *means for subtracting said adjusted signal from said third signal to obtain the error in actual dry weight of the instant weighing, and for adding to said error a signal indicative of the sum of the error in actual dry weight existing after all previous weighings and the target dry weight;* iii. means adapted to sample the signal from means (ii) during a compute period and to store said signal during all other periods; and iv. means adapted to store the output of means (iii) during said compute period and to sample said output during all other periods.

*3. Apparatus for automatically measuring and controlling the net dry weight of a batch of moisture-containing material, said batch comprising a plurality of weighings of said material, comprising:*

*(a) means for producing a first signal indicative of the wet weight of the material of each weighing;*

*(b) means for producing a second signal indicative of the moisture content of the material of the instant weighing;*

*(c) means for producing a third signal indicative of the target dry weight of the material for each weighing;*

*(d) means adapted to receive said first signal and said second signal after the instant weighing is completed*

*and compute a signal indicative of the dry weight of the material of the instant weighing;*

(*e*) *means adapted to receive said last-named signal and said third signal and compute and store a signal indicative of the sum of the target dry weight, the error in dry weight existing after the next preceding weighing, and the difference between the target dry weight and the computed dry weight of the instant weighing;*

(*f*) *means for controlling the timing of the computation and storage of signals;*

(*g*) *means for shutting off the supply of said material to said next weighing when a signal, indicative of the sum of the target dry weight, the error from all preceding weighings, and the error of the instant weighing, equals a signal indicative of the weight of the material of said next weighing; and*

(*h*) *means utilizing said second signal for modifying one of the signals supplied to means* (g) *to include the effect of the moisture content of the material of the instant weighing.*

* * * * *